United States Patent Office 2,850,357
Patented Sept. 2, 1958

2,850,357

DIGESTION OF TITANIUM DIOXIDE SLAGS

Myron L. Myers, Lynchburg, and Seldon P. Todd, Amherst, Va., and Edward W. Galloway, Atlanta, Ga., assignors to American Cyanamid Company, New York, N. Y., a corporation of Maine No Drawing. Application May 11, 1953
Serial No. 354,426

12 Claims. (Cl. 23—117)

This invention relates to the digestion of titaniferous slags with sulfuric acid for the production of digestion cakes suitable for conversion into titanium sulfate liquors of the type used in titanium dioxide pigment manufacture, the object being to produce titanic sulfate liquors containing little or no titanous sulfate. In accordance with the invention this is accomplished by decreasing or diminishing the titanous sulfate content of the primary digestion cakes, with a corresponding increase in their titanic sulfate content, by promoting conversion of the titanous oxides or other reduced titanium compounds present in the slag into titanic sulfate during the digestion and particularly during the portion thereof that is strongly exothermic, as will hereinafter be more fully described.

The smelting of titaniferous iron ores is mainly directed to the removal of the major proportion of the iron contained therein in the form of pig iron and the smelting procedure, therefore, is carried out in the presence of a carbonaceous reducing agent and in a reducing atmosphere to insure that a large proportion of the iron oxide is converted to metallic iron. Basic fluxing agents are employed in quantities such that the slag produced is in fluid condition in order that the metallic iron may be separated therefrom in molten condition by simple gravity separation. While the exact proportions of the furnace charge components will depend on the particular smelting process used and on the composition of the ore to be smelted, a satisfactory separation of iron from titanium has been obtained when the amount of basic fluxing agent is adjusted so that there is present during the smelting about one mol equivalent thereof for each mol equivalent of acidic reacting material in the ore other than the titanium dioxide and also one mol equivalent of basic fluxing agent for each five to twelve or more mol equivalents of $TiO_2$. When such mixtures are smelted within a temperature range of from about 1250° C. to about 1700° C. and in a reducing atmosphere the slag produced is in fluid condition and the molten iron may be easily separated therefrom.

Ordinarily, the ore is smelted in the presence of an amount of carbonaceous reducing agent in excess of the stoichiometrical requirement thereof for converting iron oxide to metallic iron. In most instances, satisfactory results are obtained when the amount of fixed carbon present in the reducing agent is about 50-75% of the weight of iron oxide contained in the titaniferous iron ore to be smelted. Under the above described smelting conditions most of the iron oxide is converted to molten metallic iron which settles through the fluid slag and is thereafter tapped from the furnace, the remainder of the carbon reducing tetravalent titanium to trivalent or lower valent titanium.

The slags dealt with by the invention are therefore those obtained by smelting titaniferous iron ores with coal, coke or other forms of carbon together with naturally occurring or added basic fluxing agents and drawing off molten iron. When this type of smelting process is carried out, titaniferous slags free from uncombined carbon and having a relatively high content of titanium oxides are obtained as a supernatant layer above the molten iron, and are tapped from the furnace and rapidly cooled. Such slags have a content of titanium compounds considerably higher than that present in the ores from which they are produced, the increased concentration corresponding roughly to the amount of iron removed by smelting. Depending on the particular titaniferous iron ores used and the completeness of the iron removal, such slags usually contain about 45–90% or more of titanium compounds, expressed as titanium oxides, together with about 1% to about 16% or more of iron, expressed as FeO, and about 5% to about 16% or more of the basic materials that were introduced as fluxes, usually compounds of calcium, magnesium sodium and other alkali metals and the like, together with small amounts of silica, alumina and other impurities.

Because these slags are formed in the furnace under reducing conditions, a substantial proportion of their titanium content is present in the reduced state, presumably in combination as $TiO.2TiO_2$. Hereinafter the reduced titanium will be referred to as titanium oxides or compounds. Some slags may contain as little as about 3% of trivalent (titanous) titanium oxides, the remainder being titanic (tetravalent) titanium oxides; however, the majority of slags now produced commercially contain a considerably higher proportion of reduced titanium oxides. Slags having about 10% up to as much as 30% or more of their titanium as titanous compounds, the remainder being titanic compounds, are now being produced and marketed in commercial quantities, and the present invention is directed particularly to the digestion such such slags having titanous titanium contents of this order of magnitude.

The titanium content of the above-described slags is recovered in the form of titanium sulfates by digesting the slags with strong sulfuric acid. The proportion of sulfuric acid to be used will of course depend on the composition of the slags, and particularly on the amounts of basic or acid-reactive materials therein. Usually about 1.4 to 1.8 parts by weight of sulfuric acid, calculated as 100% $H_2SO_4$ are used for each part by weight of the slag. The concentration or strength of the sulfuric acid can vary between rather wide limits.

In practicing our present invention we employ strong sulfuric acid for the digestion, and by this term we mean sulfuric acid having a sufficiently high boiling point under the digestion conditions employed to attain a reaction temperature above 175° C., and usually within the range of about 180° C. to 210° C. or higher. As a practical matter this means that sulfuric acid having an $H_2SO_4$ content of from about 75% up to about 95%– 98% should be used. It will be understood that the sulfuric acid is diluted somewhat by the steam which is ordinarily injected to heat the slag-sulfuric acid mixture to reaction temperatures, and therefore the starting or wetting acid should be somewhat stronger than 75% $H_2SO_4$. Best results are usually obtained when the strength of the wetting acid is within the range of about 79% to about 90% $H_2SO_4$.

The digestion is preferably carried out by preparing a uniform mixture of the slag in finely ground condition with the sulfuric acid and heating this mixture to the stage where a self-sustaining exothermic reaction sets in. Ordinarily the wetting acid is heated to about 50–60° C. or higher before mixing it with the slag and the further heating of the mixture is carried out by injecting live steam into the mass. When the mixture of slag and acid has attained a temperature somewhat above 150° C. a chemical reaction is noticeable, and at temperatures of 175° C. and higher this reaction becomes strongly exothermic. The reaction then becomes violent due to the fluid character of the mixture and the temperature quickly rises to a peak which is within the range of 180° C. to 210° C. or higher, depending on the strength of the acid and the composition and fineness of grinding of the slag. The speed of the reaction during this high-temperature stage is such that most of the reactive titanium compounds in the slag are converted into the corresponding titanium sulfates, steam and reaction gases being evolved in large quantities. The mixture soon solidifies or sets into a primary digestion cake which, when the reaction conditions are properly chosen, is relatively hard but porous in character. As will subsequently be explained, a principal object of our present invention is to produce, at this stage of the digestion, a cake which contains little or no titanous sulfate, the reduced titanium compounds of the slag having been oxidized and converted into titanic sulfate during the high temperature reaction.

Ordinarily the freshly-formed or primary digestion cake contains unreacted slag and also unreacted sulfuric acid. In order to complete the reaction it is customary to allow this digestion cake to stand and bake for several hours at elevated temperatures, during which time the mass slowly cools. After the reaction is complete the cake is cooled more rapidly, usually by blowing it with air, to temperatures where it is safe to add water without danger of hydrolyzing the titanium sulfate; usually the mass is cooled to about 125° C. or lower. Water is then added, while continuing the introduction of air, and the cake is thereby dissolved and converted into titanium sulfate liquor which, after clarification and adjustment of its titanous sulfate content if necessary, is suitable for hydrolysis for the production of titanium dioxide pigments.

Reference is made to U. S. Patent No. 2,531,926 for further details of one suitable method of slag digestion, clarification of the digestion liquor, and hydrolysis and titanium dioxide pigment formation.

As is stated above, the principal object accomplished by our invention is the production of primary digestion cakes having a decreased content of titanous sulfate and a correspondingly increased content of titanic sulfate, as compared with the ratio of titanous to titanic compounds in the slag. We have found that this object can be accomplished by promoting or enhancing the oxidizing action of the strong sulfuric acid during the high temperature portion of the digestion reaction.

Our present invention promotes the conversion of all or a portion of the titanous compounds of the slag into titanic sulfate by digesting these slags with strong sulfuric acid at the elevated digestion temperatures discussed above in the presence of a catalyst promoting the oxidizing action of strong sulfuric acid. By adding such catalysts to the digestion mixture, or by forming such oxidation-promoting catalysts therein, we have succeeded in diminishing the titanous sulfate content of the digestion cakes constituting the reaction product with a corresponding increase in the titanic sulfate content thereof. When the resulting digestion cakes are cooled slowly, as by allowing them to stand and bake to complete the digestion reaction, and when these cakes are then dissolved in water, liquors are formed which are substantially free from titanous sulfate, or have only a relatively low titanous sulfate content, and are therefore well suited for conversion into titanous dioxide pigments.

It is well known that strong sulfuric acid is oxidizing acid at elevated temperatures. It is also known that the oxidizing action of this acid can be promoted or enhanced by dissolving catalysts therein. Thus, the use of mercuric oxide or sulfuric acid-soluble compounds of mercury as oxidation-promoting catalysts in the Kjeldahl nitrogen determination method is well known. The addition of copper sulfate and other copper salts is likewise known to promote the oxidizing action of sulfuric acid in this process and also in sulfonation reactions. We have found that the conversion of titaniferous slags into titanic titanous compounds of titaniferous slags into titanic sulfate can be promoted to a remarkable extent by the presence of these and other known oxidation-promoting catalysts during the high-temperature stage of the digestion reaction, and the use of any such catalyst or catalysts is included within the broad scope of our invention. We have also found, however, a class of oxidation-promoting catalysts that are cheap, easily incorporated into slag-sulfuric acid mixtures and remarkably effective in promoting the desired oxidation. These are the finely divided carbonaceous catalysts.

Although any finely divided carbonaceous material will promote the conversion of the titanous compounds of slag into titanic sulfate under the reaction conditions indicated, we find that there are two broad subclasses that are of particular value. The first of these may be described as the substantially pure carbon catalysts such as coke and from coal, petroleum coke, finely divided carbon and highly carbonized carbohydrates. Substantially pure carbon catalysts of this type are not themselves readily oxidized by the sulfuric acid under the reaction conditions. The carbonaceous catalysts of the second class can be defined as those which contain incompletely carbonized hydrogen and are typified by incompletely carbonized organic materials such as carbonized naphthenic acid, carbonized sulfonated castor oil, carbonized linseed oil and other triglycerides and the like. Activated carbon such as "Nuchar" and other decolorizing carbons also fall within this class since they contain adsorbed hydrogen. The hydrogen-containing catalysts of the second class are somewhat more active than the purer forms of carbon of the first class, but they are also more reactive toward strong sulfuric acid at temperatures above 175° C. and therefore have a tendency to decompose part of the acid with additional evolution of sulfur dioxide.

The quantities of catalyst to be used can be varied throughout a wide range, depending on the amount of reduced titanium in the slag, the strength of the sulfuric acid at temperatures above 175° C., and other conditions. The effect of the catalyst is noticeable when as little as 0.01% based on the weight of the slag is used, and quantities of 0.05% to 0.1% are quite effective. From this lower range the amounts may be increased to as much as from 1% to 2%, based on the weight of the slags. It will be understood that in some cases, such as when using impure or regenerated sulfuric acids having a substantial content of carbonaceous impurities, even larger quantities of oxidation-promoting catalysts may be present; however the quantities stated are those which are most commonly employed. The catalyst may be incorporated in the reaction mixture either by dissolving or suspending it in the sulfuric acid or by mixing it with the ground slag, or both, and it may be introduced either as such or in the form of a hydrocarbon, fatty acid triglyceride, naphthenic acid, starch, sugar or other carbohydrate and the like from which it is converted into a carbonaceous catalyst as the digestion proceeds.

Under the influence of the oxidation-promoting catalysts which we employ, an accelerated or enhanced oxidation of titanous sulfate to titanic sulfate by the strong sulfuric acid is obtained at digestion temperatures above 150°–175° C. in the process of our invention. We have demonstrated experimentally the sulfuric acid oxidation of titanous to titanic sulfate under these conditions by a series of laboratory tests in which mixtures of titanous sulfate with 85% sulfuric acid were heated at 210° C. and the degree of oxidation to titanic sulfate was followed by measuring the rate of evolution of sulfur dioxide. When no catalyst was present only a slight sulfur dioxide evolution was obtained, even after the mixture had been heated at 210° C. for as long as 2 hours. The addition of catalytic quantities of one or more of the oxidation-promoting catalysts listed above, however, caused a rapid oxidation to occur, with formation of titanic sulfate and rapid evolution of sulfur dioxide. With the most active catalysts such as naphthenic acid, activated carbon, copper sulfate and mercurous and mercuric sulfate, the sulfur dioxide evolution was substantially complete in about 20–40 minutes; with less active carbonaceous catalysts such as finely divided low ash coal the oxidation reaction proceeded to completion over a longer period of time. The quantities of catalysts used in these experiments varied from about 0.05% to about 0.1%, based on the weight of the titanous sulfate-sulfuric acid mixture. It is evident therefore that, during the high-temperature digestion, the sulfuric acid attacks both the titanous and the titanic constituents of the slag, converting them into the corresponding titanous and titanic sulfates. Simultaneously, under the influence of the added oxidation-promoting catalysts, the sulfuric acid also oxidizes part or all of the freshly-formed titanous sulfate to titanic sulfate, thus producing digestion cakes having a desirably low titanous sulfate content.

The finely divided carbon may be added to the slag at any point prior to the initiation of the digestion reaction. Activated carbon or an organic carbonaceous material such as starch or other carbohydrate which is capable of being converted to finely divided carbon by reaction with the concentrated sulfuric acid employed in the digestion may be mixed with the slag or with the slag-acid mixture by any suitable means. One source of carbon which has been found to function satisfactorily as an oxidation catalyst in the method of the present invention is the carbon contained in so-called "sludge acid" that has been concentrated. This acid is obtained by hydrolyzing acid sludges that are produced in the refining of petroleum fractions containing unsaturated hydrocarbons with concentrated sulfuric acid and concentrating the resulting dilute acid by heating as is described, for example, in Fairlie "Sulfuric Acid Manufacture," pages 293–306. The acid is concentrated to about 80–94% $H_2SO_4$ content and ordinarily contains about 0.5–2% of finely divided carbon. Carbon-containing sulfuric acids from this and other similar sources, such as "alkylation acid," acid used in the production of propanol from propene, and the like may be employed in the digestion of high $TiO_2$ content slags and to provide as well the carbon necessary to catalyze the oxidation of the titanous titanium of the slags.

Subsequent to the digestion treatment the cake obtained is blown with air, and the air blowing is continued as water is added to dissolve the digested materials. This cooling treatment is resorted to in order to maintain temperatures lower than about 75° C. during the water addition to prevent premature hydrolysis of the titanic titanium. During the air blowing cycle, which is ordinarily carried out over a period of 2–3 hours, sufficient of the remaining reduced titanium is oxidized to provide a liquor containing less than about 2.5% of the titanium in reduced state. However, we have found that about 70% or more of the oxidation of the titanous titanium usually takes place during the sulfuric acid digestion leaving only a minor quantity of reduced titanium to be oxidized during the air blowing treatment. It will thus be seen that we have provided a novel method of oxidizing and controlling the quantity of reduced titanium in the digestion liquors obtained from high titanium-content slags. The method of our invention permits substantial economies in such pigment production since it greatly reduces the lengthy, and consequently costly, aeration procedure that would otherwise be necessary as a means of control of reduced titanium in use of these slags.

It will be seen that since the present invention affords a method of producing digestion liquors containing little or no reduced titanium, the content of hydrolyzable $TiO_2$ in the liquor will be substantially higher than would otherwise be the case. In the event that the digestion liquor contains some iron but no reduced titanium, it is advisable to prepare separately a solution containing reduced titanium and to add to the liquor prior to hydrolysis sufficient of this solution to insure the presence of from 1% to about 2.5% of trivalent titanium during the hydrolysis treatment based on the total titanium content. Thus, it will be assured that none of the ferrous sulfate present in the solution will be converted to ferric state during the hydrolysis treatment, and the titanium dioxide thereby produced will possess optimum color characteristics upon calcination.

In order that the method of our invention may be better understood by those skilled in the art the following examples are presented. It will be understood, however, that these examples are given primarily for illustrative purposes and that modifications thereof may be resorted to within the scope of the invention as defined by the appended claims.

Example 1

One hundred and fifty (150) pounds of a titaniferous iron ore were smelted with 21.5 pounds of coke and 10.5 pounds of limestone. The limestone and coke had the following approximate compositions:

|  | Limestone | Coke |
| --- | --- | --- |
|  | Percent | Percent |
| FeO | 0.45 | 0.90 |
| $SiO_2$ | 2.00 | 3.10 |
| $Al_2O_3$ | 0.50 | 2.60 |
| CaO | 53.60 |  |
| MgO | 0.80 |  |
| Fixed C |  | 90.0 |

The titaniferous iron ore had the following composition: FeO—32.38%, $Fe_2O_3$—24.00%, $TiO_2$—36.70%, $SiO_2$—1.27%, $Al_2O_3$—2.39%, CaO—0.05%, MgO—3.06%. The calculation of a material balance of the acetic and basic components of this furnace charge will show that there is one mol of basic material for each mol of acidic material other than $TiO_2$, plus an amount of basic material which is equivalent to one mol for each 5.25 mols of $TiO_2$.

The furnace charge was smelted in a 54 volt, 100 kilowatt electric furnace for about 1.75 hours during which time a fluid slag formed and most of the iron oxides were reduced to metallic iron which settled in molten state beneath the slag. The slag was tapped into a large iron pan, forming a thin layer which cooled rapidly to below red heat.

The so-produced slag contained 67.9% of titanium oxides, 8.9% of iron expressed as FeO, and 18.5% of basic oxides of calcium, aluminum, and magnesium, 600 grams of the slag were ground to pass through a screen having 325 meshes per linear inch. Thereafter, sufficient 89% sulfuric acid to neutralize all of the iron and the basic oxides of the slag and to theoretically convert 70% of the $TiO_2$ therein to $Ti(SO_4)_2$ was heated to 50–60° C. and the slag was gradually added thereto. After heating to 160–175° C., an aqueous 10% slurry containing 6 grams of starch was added to the slag-acid mixture and the mixture was stirred to insure uniform distribution of the starch therethrough. The heating was continued until reaction took place, a maximum temperature of about 210° C. being attained. The reacted material was allowed to stand and bake for about 4 hours to insure substantially complete reaction. After baking, air was blown through the digestion cake to remove reaction gases, and the air blowing was continued as water was added to the cake to dissolve the sulfates produced during the digestion period. The complete air blowing cycle was about 30 minutes. The aqueous liquor obtained contained approximately 14% of titanium expressed as soluble $TiO_2$, and contained only 0.6 gram per liter of trivalent titanium. The solution was then clarified and was thermally hydrolyzed by boiling it for 3–4 hours. The hydrous titanium dioxide obtained was thereafter calcined and produced a pigment having good tinting strength, color, and texture characteristics.

A control sample which was produced under similar conditions from the same slag but without the addition of any starch contained 6.0 grams per liter of trivalent titanium, or ten times the amount present when starch was used. In order to decrease the content of titanous titanium below 3 grams per liter, it was necessary to air blow for about 8 hours.

*Example 2*

Six hundred (600) grams of the above described slag were ground to pass through a screen having 325 meshes per linear inch. A "dirty" sulfuric acid obtained by hydrolyzing refinery sludge with steam under 50–100 lbs. pressure was concentrated to about 93% acid by blowing it with hot gases in a drum-type concentrator. This sulfuric acid contained about 0.8% of finely divided carbon. The acid was heated to 50–60° C. and the ground slag was added gradually to the heated acid and the mixture was stirred for 3 minutes and was then heated until reaction took place. The reaction cake was thereafter treated according to the procedure set forth in Example 1. The aqueous liquor obtained contained approximatley 13.5% of titanium expressed as soluble $TiO_2$, and contained only 0.8 gram per liter of trivalent titanium or approximately 0.4% of reduced titanium based on the total titanium in solution.

*Example 3*

Two digestions were carried out with 85% $H_2SO_4$ employing slag containing about 63.2% of $TiO_2$, including 12.1% of titanous titanium oxides, about 16.7% of iron expressed as FeO, including 1.1% of metallic iron, 5.4% of $SiO_2$, 5.6% of $Al_2O_3$, 0.1% of CaO, 6.0% of MgO, 0.24% of MnO, 0.14% of $Cr_2O_3$, and 0.36% of $V_2O_3$. In one digestion no carbon was present in the slag-acid mixture. In the other digestion, the mixture was heated to about 160° C. and a 10% aqueous starch solution was added to the mixture, the amount of starch added being 0.66% of the weight of the slag. In both digestions, the reaction mixture was swept with $CO_2$ throughout the reaction period to insure that no oxidation of reduced titanium would be caused by the surrounding air.

A portion of the digestion cake of the control sample, which was digested without addition of starch, was blown with $CO_2$ for 3 hours during the latter part of which period water was added to the cake to dissolve the titanium sulfate and other soluble materials. In the liquor obtained, 10.7% of the titanium present was in the titanous state. To a further portion of the cake of the control sample was added finely divided activated carbon (0.66% by weight based on the slag) and the cake was blown with air as above described. In the liquor obtained, 9.35% of the titanium was in the titanous state.

A portion of the digestion cake of the sample which was digested in the presence of starch was blown for three hours with $CO_2$, water being added during the latter part of the period. In the liquor obtained, 4.18% of the titanium was in the titanous state.

Activated carbon (0.66% based on the weight of the slag) was distributed uniformly throughout another portion of the starch-containing digestion cake. This portion was then blown with air and leached with water. In the liquor thereby obtained, 3.8% of the titanium was in titanous state.

A further portion of this digestion cake was blown with air and leached with water as above described. In the liquor obtained, 3.9% of the titanium was in titanous state.

These digestions show that the addition of carbon subsequent to digestion does not catalyze oxidation of the reduced titanium. They also show that most of the oxidation occurs during the sulfuric acid digestion of the slag in the presence of carbon. However, the air blowing of the digestion cake is important since when continued it brings the reduced titanium content of the liquors within the upper limit of about 2.5% usually desired at the subsequent thermal hydrolysis of the liquors.

*Example 4*

A slag produced commercially by smelting a ferrotitaniferous ore with coal and basic fluxing agents has the following composition:

| | Percent |
|---|---|
| Tetravalent titanium as $TiO_2$ | 57.0 |
| Trivalent titanium as $TiO_2$ | 14.6 |
| Total | 71.6 |
| Iron as FeO | 7.5 |
| MgO | 5.1 |
| $Al_2O_3$ | 6.8 |
| $SiO_2$ | 6.0 |
| Total S | 0.2 |
| Other metal oxides | 2.1 |
| Carbon | None |
| Total | 99.3 |

A sample of this slag was grounded to 98.4% minus 325 mesh and 83.5% plus 10 microns and a 1 kilogram portion was mixed with a digestion acid prepared by suspending 1 gram of naphthenic acid in 233 cc. of water, adding 1539 grams of 98% sulfuric acid and cooling the mixture to 60° C.

The mixture was heated in a steel reactor according to the following schedule:

| Time (minutes): | Temperature, ° C. |
|---|---|
| 0 | 60 |
| 2 | 118 |
| 4 | 148 |
| 6 | 186 |
| 8 | 198 |
| 10 | 197 |
| 12 | [1] 194 |

[1] Cake formed.

The cake was baked for 3 hours at temperatures above 150° C., broken out of the reaction vessel, cooled to below 70° C., and dissolved in water at 50° C. No air was passed through the reaction mixture or cake. The resulting solution, upon analysis, was found to contain no titanous sulfate, all of the reduced titanium compounds in the slag having been converted into titanic sulfate during the reaction. The digestion yield was 83.2% and the digestion liquor, after filtering, had the following composition:

| | |
|---|---|
| $TiO_2$ percent | 9.9 |
| $FeSO_4$ do | 3.8 |
| Active acid | 21.1 |
| Basicity | 13.0 |
| Stability | I–300 |

The stability value of I–300 indicates that 1 cc. of the solution did not hydrolize when mixed with 100 cc. of water at 25° C. and that hydrolysis took place only when the resulting solution was diluted with an additional 200 cc. of water. This value is indicative of very satisfactory stability.

*Example 5*

Another sample of the ground slag of Example 4, weighing 1 kilogram, was mixed with 1860 grams of 85% sulfuric acid in which 0.5 gram of activated carbon (Nuchar C–151) was suspended. The mixture was heated with agitation to 180° C. whereupon a violent exothermic reaction set in that carried the temperature to a peak of 202° C. After this had subsided a digestion cake formed that was baked 3 hours at temperatures above 150° C., cooled to 70° C. and dissolved in water. No air was passed through the reaction mixture or cake. The digestion liquor had a total TiO$_2$ content of 13.7%, a total SO$_4$ content of 30.4% and contained 11.2% of soluble TiO$_2$. The digestion yield was 82%.

After clarification and filtration the liquor had the following analysis:

| | |
|---|---|
| TiO$_2$ | 9.5%. |
| FeSO$_4$ | 4.6. |
| Active acid | 22.6. |
| Basicity | 13.6. |
| Reduced TiO$_2$ | 3.8 grams per liter or 2.65% of the total titanium in solution. |

This is a continuation-in-part of our copending application Serial No. 76,663, filed February 15, 1949, now abandoned.

We claim:

1. A method of reducing the titanous sulfate content and correspondingly increasing the titanic sulfate content of digestion cakes produced by the sulfuric acid digestion of titaniferous slags having a substantial content of titanous compounds which comprises digesting said slags with strong sulfuric acid at digestion temperatures above about 150° C. in the presence of a carbonaceous catalyst promoting the oxidizing action of said acid.

2. A method of reducing the titanous sulfate content and correspondingly increasing the titanic sulfate content of digestion cakes produced by the sulfuric acid digestion of carbon-free slags obtained by smelting titaniferous iron ores with carbon and basic fluxing agents and drawing off molten iron, said slags having a substantial portion of their titanium content as titanous compounds and the remainder as titanic compounds, which comprises digesting said slags with strong sulfuric acid at digestion temperatures above about 150° C. in the presence of a carbonaceous catalyst promoting the oxidizing action of said acid.

3. A method according to claim 2 wherein said carbonaceous catalyst is a member of the group consisting of coal, coke, activated carbon and carbonized carbohydrates.

4. A method according to claim 2 wherein said carbonaceous catalyst is a carbonized naphthenic acid.

5. A method of reducing the titanous sulfate content and correspondingly increasing the proportion of titanic sulfate content of digestion cakes produced by the sulfuric acid digestion of carbon-free slags obtained by smelting titaniferous ores with carbon and basic fluxing agents and drawing off molten iron, said slags having about 10% to 30% of their titanium as titanous compounds and the remainder as titanic compounds, which comprises digesting said slags with strong sulfuric acid at digestion temperatures above about 150° C. in the presence of about 0.01% to 2%, based on the weight of the slag, of a carbonaceous catalyst promoting the oxidizing action of said acid.

6. In the sulfuric acid digestion of titaniferous slags having a substantial content of titanous compounds, the method of promoting the conversion of said titanous compounds into titanic sulfate during the digestion which comprises digesting said slags with strong sulfuric acid at digestion temperatures above about 175° C. in the presence of a finely divided carbonaceous catalyst promoting the oxidizing action of said acid.

7. A method according to claim 6 wherein the quantity of carbonaceous catalyst is within the range of 0.01% to about 2% of the weight of the slag.

8. In the sulfuric acid digestion of carbon-free slags obtained by smelting titaniferous iron ores with carbon and basic fluxing agents and drawing off molten iron, said slags having a substantial portion of their titanium content as titanous compounds and the remainder as titanic compounds, the method of promoting the conversion of said titanous compounds into titanic sulfate during the digestion which comprises digesting said slags with strong sulfuric acid at digestion temperatures above about 175° C. in the presence of about 0.01% to 2%, based on the weight of the slag, of finely divided carbon.

9. A method of reducing the titanous sulfate content and correspondingly increasing the titanic sulfate content of digestion cakes produced by the sulfuric acid digestion of titaniferous slags having a substantial content of titanous compounds which comprises digesting said slags at digestion temperatures above about 150° C. with strong sulfuric acid having dispersed therein a carbonaceous catalyst promoting the oxidizing action of said acid.

10. The method which comprises digesting with strong alkylation sulfuric acid containing suspended carbonaceous impurities at temperatures above about 150° C. a slag obtained by smelting titaniferous iron ore with carbon and basic fluxing agents and drawing off molten iron, said slag being characterized by a substantial content of titanous oxide.

11. A method of producing titanic sulfate liquors suitable for conversion into titanium dioxide pigments from carbon-free slags obtained by smelting titaniferous iron ores with carbon and basic fluxing agents and drawing off molten iron, said slags containing from about 10% to 30% of their titanium in the form of titanous compounds and the remainder as titanic compounds, which comprises digesting said slags with strong sulfuric acid at digestion temperatures above 175° C. in the presence of a carbonaceous catalyst promoting the oxidizing action of said acid and thereby producing digestion cakes having a greatly increased proportion of titanic sulfate as compared with the ratio of titanic to titanous compounds in the slag, baking said digestion cakes and then cooling and adding water thereto while introducing air and thereby forming liquors wherein the titanous sulfate is less than 2.5% of the total titanium sulfate present.

12. A method according to claim 11 wherein said carbonaceous catalyst is a member of the group consisting of coal, coke, activated carbon and carbonized carbohydrates.

References Cited in the file of this patent

UNITED STATES PATENTS

| | | |
|---|---|---|
| 1,196,029 | Rossi et al. | Aug. 29, 1916 |
| 1,196,031 | Rossi et al. | Aug. 29, 1916 |
| 1,889,027 | Washburn | Nov. 29, 1932 |
| 1,891,911 | Brode | Dec. 27, 1932 |
| 1,125,340 | Hager | Aug. 2, 1938 |
| 2,148,283 | Washburn | Feb. 21, 1939 |
| 2,149,370 | Smith | Mar. 7, 1939 |
| 2,313,910 | Archibald | Mar. 16, 1943 |
| 2,445,377 | Wyckoff | July 20, 1948 |
| 2,476,453 | Pierce | July 19, 1949 |
| 2,531,926 | Todd et al. | Nov. 28, 1950 |

FOREIGN PATENTS

| | | |
|---|---|---|
| 391,704 | Canada | Oct. 1, 1940 |

OTHER REFERENCES

Metals Transactions, vol. 185, pages 785–791, November 1949.

"Titanium," Barksdale, 1949 Ed., page 128, Ronald Press Co., N. Y.

McPherson and Henderson, General Chemistry, 3rd Ed., Ginn and Co., N. Y., page 352.